United States Patent [19]

Zur

[11] 4,133,573
[45] Jan. 9, 1979

[54] AUTOMOBILE BODY

[76] Inventor: Henry C. Zur, 10 W. Griswold, Phoenix, Ariz. 85021

[21] Appl. No.: 723,448

[22] Filed: Sep. 15, 1976

[51] Int. Cl.² .................... B62C 1/06; B62D 33/02
[52] U.S. Cl. ............................ 296/26; 296/28 R; 296/137 R
[58] Field of Search .............. 296/23 G, 26, 26 X, 296/27, 27 X, 102, 107, 112, 137 R

[56] References Cited

U.S. PATENT DOCUMENTS

| 3,169,792 | 2/1965 | Viquez | 296/26 |
|---|---|---|---|
| 3,233,936 | 2/1966 | Jakosky | 296/26 |
| 3,619,001 | 11/1971 | Borskey | 296/26 |
| 3,762,759 | 10/1973 | Hall | 296/27 |

*Primary Examiner*—Richard A. Bertsch

[57] ABSTRACT

An automobile body comprising a fixed lower part including a floor and side walls extending upwardly from the floor; a permanent roof covering the fore portion of said fixed part; and an adjustable roof hingedly mounted on said permanent roof at the front edge thereof. Side panels depend from the adjustable roof in overlapping relation to said side walls with inflatable sealing tubes between the two. A front seat is fixedly mounted on the floor beneath the permanent roof. A foldable rear seat is mounted behind the front seat and is adapted to assume the position immediately behind the front seat leaving a large space in the car body therebehind for cargo storage purposes. A pair of piston and cylinder assemblies are provided at the sides of the fixed part for raising or lowering the adjustable roof. A locking device is associated with each of these assemblies. The fixed part has a rear door that may be swung on either a vertical or horizontal axis. The adjustable roof includes a hatch back pivotably mounted on the rear portion thereof with a rear wall that is movable into and out of a position overlapping the rear door. Cylinder and piston assemblies are provided for achieving such movements.

14 Claims, 13 Drawing Figures

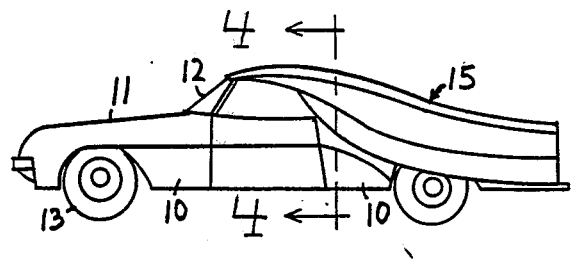
FIG_1
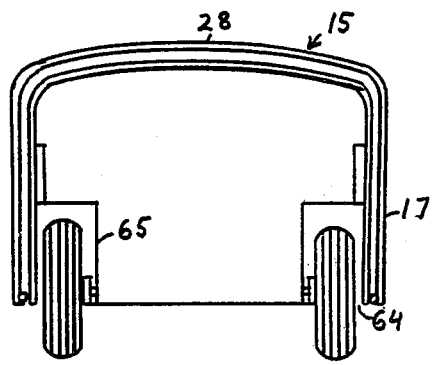
FIG_4
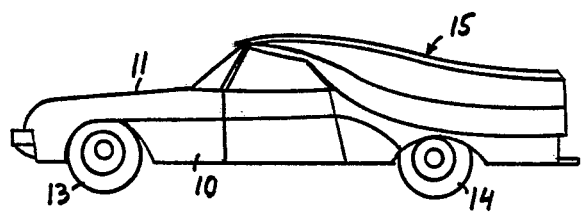
FIG_2
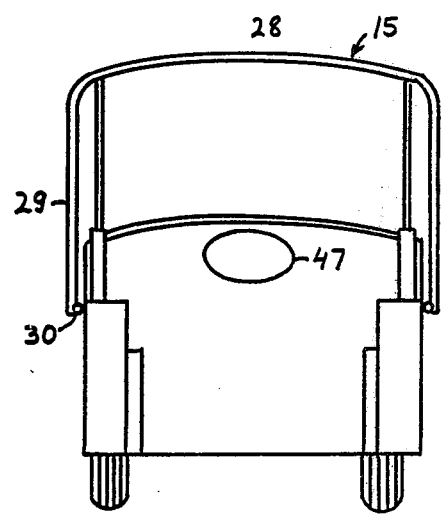
FIG_5
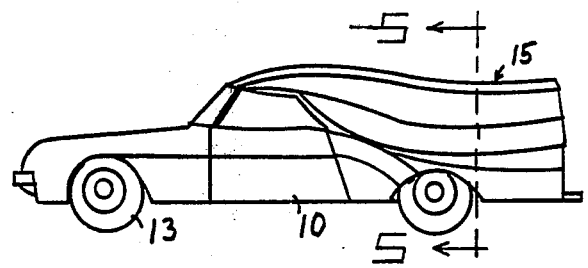
FIG_3
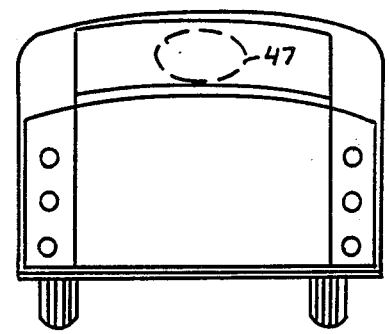
FIG_6

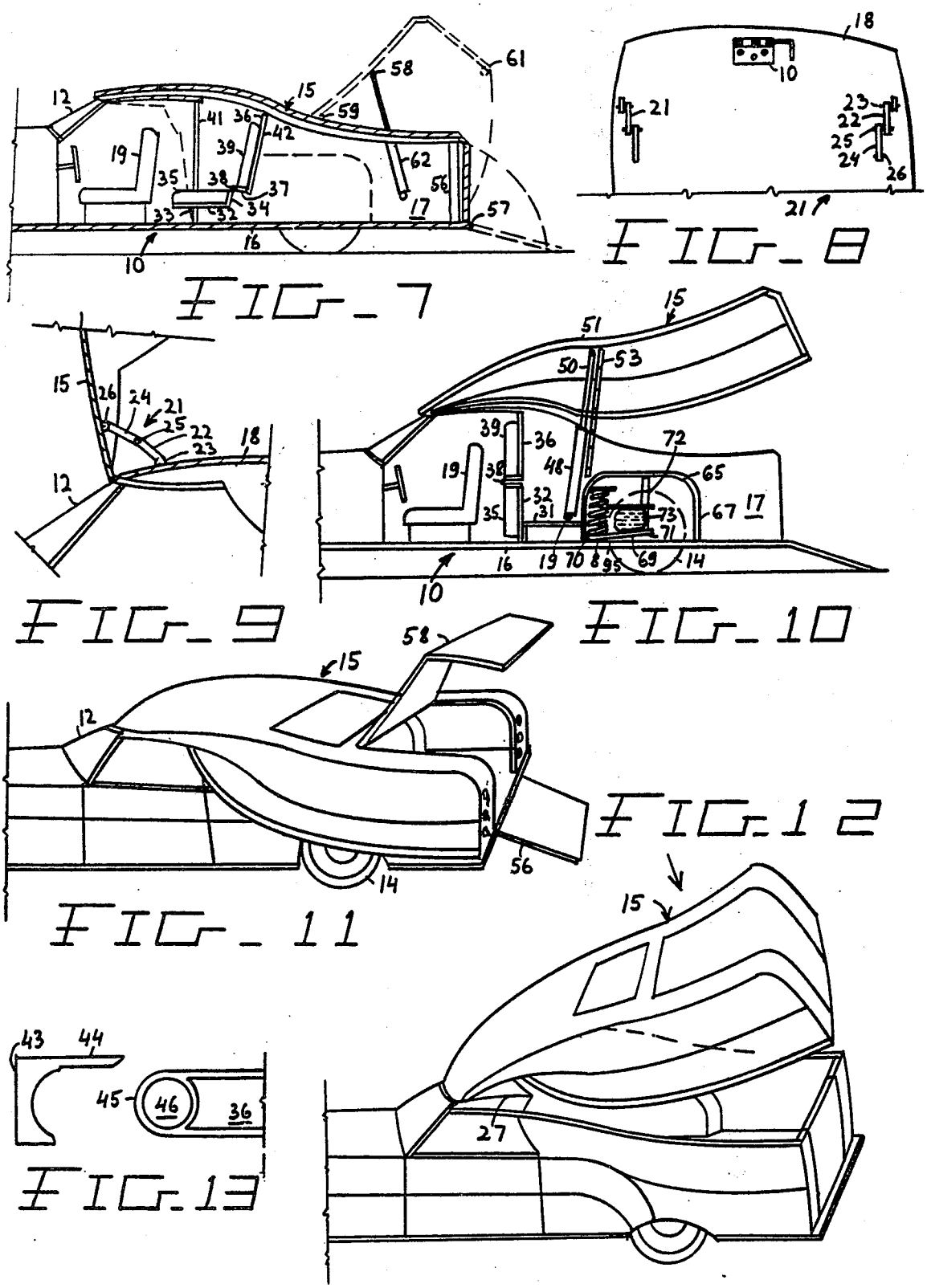

AUTOMOBILE BODY

The present invention relates to automobile bodies and is concerned primarily with a body which includes a permanent roof at the front portion thereof with an adjustable roof having side panels hingedly mounted on the fore edge of the permanent roof whereby the cargo receiving space of the body is susceptible of adjustment.

BACKGROUND OF THE INVENTION

At the present time automobiles of the station wagon type are coming into ever increasing use by the public. Perhaps the principal advantage which attends a station wagon is that the rear seat or seats thereof may be removed or folded into an out of the way position to afford maximum space for cargo receiving purposes. A conventional station wagon includes a floor, a roof, and a pair of side walls therebetween and all of which are fixedly related. Thus the cargo receiving space has fixed limits.

While attempt has been made to increase the cargo space of an automobile body by providing a roof for the rear portion thereof which is hingedly mounted on its front edge such an automobile body has met with little if any public acceptance because of the distorted and ugly appearance which is offered by the body when the roof is elevated. The interior of station wagons are also highly visible which is often undesirable.

The present invention is predicated on the belief that an automobile of the station wagon type, which includes an adjustable roof that extends from the upper edge of the windshield to the rear of the body and which may be swung into position increasing the cargo capacity of the body without distorting the sleek modern appearance of the automobile will satisfy a long felt need.

OBJECTS OF THE INVENTION

With the foregoing conditions in mind the present invention has in view the following objectives:

1. To provide an automobile body including a roof that has side panels depending therefrom and which is swingably mounted at the upper edge of the windshield whereby the cargo receiving space of the body is rendered adjustable.

2. To provide, in an automobile body of the type noted, a fixed lower part having side walls upstanding therefrom and which are overlapped by the side panels of the adjustable roof.

3. To provide, in an automobile body of the character aforesaid, sealing strips between the side panels and side walls and which are effective in any adjusted position of these elements.

4. To provide, in an automobile body of the kind described, a permanent roof which extends rearwardly of the upper edge of the windshield and which covers the front seat of the automobile.

5. To provide, in an automibile body of the type noted, a hinge arrangement for mounting the front edge of the adjustable roof to the front portion of the permanent roof.

6. To provide, in an automobile body of the character aforesaid, a rear seat behind the front seat and which is foldable into a vertical position immediately behind the front seat to increase the cargo capacity of the body.

7. To provide, in an automobile of the kind described, means for securing the rear seat in either of its adjusted positions.

8. To provide, in an automobile body of the type noted, mechanism for elevating or lowering the adjustable roof relative to the fixed body part and locking the roof in an adjusted position.

9. To provide, in an automobile body of the character aforesaid, a rear door for the fixed body part which may be swung on either a vertical or a horizontal axis.

10. To provide, in an automobile body of the kind described, an adjustable roof that includes a hatch back which is pivotably mounted thereon at the rear portion thereof and which includes a rear wall that overlaps the rear door when the hatch back is in closed position.

11. To provide, in an automobile body of the type noted, a sealing strip between the rear edge of the floor and the rear wall of the hatch back; and 12. To provide, in an automobile body of the character aforesaid, mechanism for raising and lowering the hatch back and securing it in an adjusted position.

Various other more detailed objects and advantages of the invention, such as arise in connection with carrying out the above ideas in a practical embodiment will, in part, become apparent and, in part, be hereinafter stated as the description of the invention proceeds.

SUMMARY OF THE INVENTION

The foregoing objects are achieved by providing an automobile which preferably has a front wheel drive and includes a body comprising a fixed part having a floor formed with openings which accommodate the rear wheels of the automobile and walls upstanding from its side edges and extending over the rear portion of the body. A conventional front seat is located behind the windshield and is covered by a permanent roof the front edge of which coincides with the upper edge of the windshield.

An adjustable roof has its front edge pivotably connected to the front edge of the permanent roof by a central hinge and two pairs of arms each comprising two arms pivotably connected with one end of one arm being pivoted to the underside of the adjustable roof at one side and an end of the other arm being pivoted to the upper surface of the permanent roof. A pleated flexible waterproof piece encloses the hinge arrangement having edges secured to the front and side edges of the roofs.

Panels depend from the side edges of the adjustable roof and overlaps the side walls of the fixed part. Inflatable sealing strips extend along the lower edges of these panels and engage outer surfaces of the side walls to create a weather seal in any adjusted position of the roof.

A rear door is mounted on the fixed part for swinging movement on either a horizontal or a vertical axis as is now well known in this art. A hatch back is included in the adjustable roof and has a rear wall that overlaps the rear door when the hatch back is closed. An inflatable sealing strip is secured to this rear wall along its lower edge and engages the rear edge of of the floor when the hatch back is closed.

A pair of cylinder and piston assemblies are located on the interior of the body at the sides thereof and are operable to move the adjustable roof into a closed position. Each of these assemblies has a lock for securing an adjusted position. A second pair of cylinder and piston assemblies are provided for raising and lowering the hatch back.

A base for supporting a rear seat is supported by the floor in spaced relation thereto. A rear seat panel is pivoted to the front edge of this base and is covered by a foam seat pad which engages a flange on the rear edge of the seat panel. A back panel has a flange extending forwardly from its lower edge and is fixedly connected to the upper edge of the flange on the seat panel. A back pad is carried by this back panel.

The rear seat is held in open position for passenger occupancy by an inflatable tube secured to the side and top edges of the back panel, and which, when inflated, is received in grooves formed in strips of molding secured to the inner surfaces of the side walls and roof. The rear seat may be folded in a so-called vertical position in which the seat and back panels align in a position closely behind the front seat. Molding strips and an inflatable tube similar to the arrangement above described secure this position.

To accommodate the rear wheels each of the side walls which upstand from the fixed part are cut away at the opening in the floor through which a wheel projects. A casing of U-shape vertical cross section is mounted on the floor over the opening. An arm has one end pivoted to the floor and its other end pivotably connected to a wheel axle. A spring, shock absorber, and an air bag are associated with this arm to provide good riding characteristics.

For a full and more complete understanding of the invention reference may be had to the following description and accompanying drawings wherein:

FIG. 1 is a side view, somewhat diagramatic, of an automobile including a body designed in accordance with the invention and depicting the adjustable roof in its fully closed position.

FIG. 2 is a view similar to FIG. 1 illustrating the roof in a partially opened position.

FIG. 3 is another view similar to FIGS. 1 and 2 showing the roof as fully opened.

FIG. 4 is a transverse vertical section through the adjustable roof in closed position, being taken on the plane of line 4—4 of FIG. 1.

FIG. 5 is a sectional view similar to FIG. 4 with the adjustable roof fully open, being taken on the plane of line 5—5 of FIG. 3.

FIG. 6 is view in rear end elevation of the body as shown in FIG. 2.

FIG. 7 is a longitudinal vertical section through the floor and roofs with parts omitted.

FIG. 8 is a top plan view of a portion of the permanent roof with the adjustable roof omitted and depicting the hinge arrangement for mounting the adjustable roof thereon.

FIG. 9 is a detail on an enlarged scale showing the hinge arrangement when the adjustable roof is moved into a vertical position such as would be required for its removal.

FIG. 10 is a sectional view similar to FIG. 7 showing the adjustable roof as fully opened, the rear seat in vertical position, and details of the suspension for the rear wheels.

FIG. 11 is a perspective of the body with the adjustable roof fully closed, the hatch back open, and the rear door swung downwardly on its horizontal pivot in position to function as a ramp.

FIG. 12 is another perspective of the body with the hatch back and rear door closed and the adjustable roof in an extended open position, and FIG. 13 is a detail on an enlarged scale showing the elements of a connection of the rear seat back panel to the body in exploded relation.

DESCRIPTION OF THE PREFERRED EMBODIMENT

Referring now to the drawing wherein like reference characters denote corresponding parts throughout the several views and first more particularly to FIGS. 1, 2 and 3, an automobile embodying the precepts of this invention is shown as including a fixed body part 10, a hood 11 mounted thereon, a windshield 12, front driving wheels 13, rear wheels 14 and an adjustable roof designated generally 15.

Referring now to FIG. 7, fixed body part 10 is shown as comprising a floor 16 and side walls 17 upstanding therefrom. A permanent roof 18 is supported by side walls 17 and extends rearwardly to cover front seat 19 and slightly therebeyond.

As shown in FIG. 8 roof 18 carried a hinge 20 on its upper surface and two pairs of arms each designated generally 21. Hinge 20 is located centrally and adjacent to the front edge of roof 18. Each pair of arms 21 is positioned adjacent to a side edge and rearwardly of the front edge of roof 18. Each pair of arms 21 comprises an arm 22 pivoted at one end as indicated at 23 to roof 18 and at its other end to one end of arm 24 as shown at 25. The other end of arm 24 has a pivot pin 26 which is mounted on the underside of roof 15.

Referring for the moment to FIG. 12, a pleated piece of waterproof flexible material 27 has its edges secured to corresponding edges of roofs 15 and 18 about the arrangement of hinge 20 and arms 21. Thus, weather protection is provided when roof 15 is in a raised position.

Referring now to FIGS. 4 and 5 adjustable roof 15 comprises a top wall 28 and side panels 29 which depend therefrom and overlie side walls 17 in slightly spaced relation. Sealing strips in the form of inflatable tubes 30 are mounted on the lower edges of panels 29. When deflated they allow for easy movement of panels 29 relative to walls 17. However, after an adjusted position has been achieved they may be inflated to secure the adjusted position.

Referring now to FIGS. 7 and 10 a base 31 is mounted on floor 16 in spaced relation thereabove. A rear seat panel 32 is pivoted at 33 to the front edge of base 31 and has a flange 34 upstanding from its rear edge. A foam seat pad 35 is carried by panel 32. A back panel 36 has a flange 37 at its lower end. The free edges of flanges 34 and 37 are hingedly connected as shown at 38. A foam seat pad 39 is secured to back panel 36.

The reat seat is intended to asume either of the positions of FIG. 7 or 10. To secure the seat in either of these positions molded strips shown at 40 in FIG. 13 are secured to the inner surfaces of side walls 17 and roof 15 at two locations. One of these is represented by the groove 41 in FIG. 7 and the other by groove 42 in the same Figure.

Upon referring to FIG. 13 it will be understood that while only one connection between a body part and back panel is illustrated, the same mechanism obtains throughout the meetings. Molding strip 40 which preferrably is of plastic includes a main body portion 43 which is secured to the inner face of the particular body part and is formed with either groove 41 or 42. An abutment flange 44 extends inwardly from one side of groove 41. When a strip 40 provides a groove 41, flange 44 is on the forward side of strip 40. If flange 44 provides a groove 42 flange 44 will be on the rear. This position of flange 44 provides for it acting as an abutment which limits movement of the back panel and positions the edges thereof in proper relation to the grooves 41 and 42.

Secured to each of the side and top edges of back panel 36 is a rubber boot 45. Enclosed by boot 45 is an inflatable tube 46. It is evident that with boot 45 aligning with groove 41, tube 46 may be inflated to secure the back panel in position. With the rear seat in the positon of FIG. 10, rear vision would be obscured. However, to provide for such rear vision that portion of back panel 36 which extends above pad 39 may be formed with an opening 47 which appears in FIGS. 5, 6 and 12.

Referring now to FIG. 10 a cylinder 48 has its lower end pivoted to base 31 at 49. A piston 50 is reciprocal in cylinder 49 and its upper end is connected to roof 15 as shown at 51. Cylinder 49 may be operated either hydraulically or by air. In either case with one of these assemblies on each side of fixed part 10, roof 15 may be elevated or lowered. A locking device for securing an adjusted position is associated with each cylinder. While it may take any of several forms, it is shown as comprising a tube 52 having an aperture therein. A rod 53 is slidable in tube 52. Its upper end is secured to roof 15 and is formed with a series of orifices 54. When one of the latter aligns with the aperture in tube 52 locking pin 55 is passed through the aligned openings to secure the adjusted position.

As shown in FIGS. 7, 10 and 11, fixed body part 10 includes a rear door 56. This door may be swung into or out of closed psoition on either a horizontal or vertical axis in accordance with known practice. The horizontal axis is indicated at 57 and permits door 56 to be swung into a positon in which it may be used as a ramp.

The car body may also a hatch back that is built into roof 15. It is shown in FIGS. 7 and 11. Thus, hatch back 58 is hingedly mounted at 59. It includes a rear wall 60 which, when in closed position overlaps rear door 56. A sealing strip in the form of an inflatable tube 61 extends along the rear edge of wall 60. It engages the rear edge of floor 16 when the hatch back is closed.

Power means for raising or lowering hatch back 58 may take the form of a pair of cylinders 62 secured to the side walls 17 and pistons 63 reciprocal in cylinder 62 and connected to hatch back 58.

Upon referring to FIG. 4 it will be seen that floor 16 is formed with an opening 64 at each side. These openings accommodate rear wheels 14. Positioned over each opening 64 is a casing comprising an inner wall 65 (FIG. 4) that is parallel to a side wall 17, a front end wall 66 (FIG. 10), a rear end wall 67, and a top wall 68.

An arm 69 has one end pivoted to floor 16 at 70. It extends over opening 64 and its other end is pivoted to an axle 71 on which a wheel 14 is mounted. A shock absorber 72 depends from top wall 68 and is connected by a bar 73 with arm 69. A plate 74 extends from bar 73 while a second plate is carried by arm 69 in confronting relation to plate 74. An air bag 76 is interposed between plates 74 and 75. A spring abutment 77 extends into the casing from wall 66 and a spring 78 is positioned between abutment 77 and plate 75; thus a suspension for each rear wheel comprises an arm 69, shock absorber 72, air bag 76 and spring 78.

It will be understood that the various inflatable tubes and cylinders are connected to a suitable source of air under pressure such as a tank or compressor and includes control valves which would preferrably be located on the dash board or convenient to the front seat.

While preferred specific embodiments of the invention are hereinbefore set forth it is to be clearly understood that the invention is not to be limited to the constructions, mechanisms, and devices illustrated and described because various modifications of these details may be provided in putting the invention into practice.

What is claimed is:

1. In an automobile including a front seat, a windshield and a permanent roof extending rearwardly from the windshield over said front seat; a body comprising:
    (a) a fixed body part comprising a floor and walls upstanding from side edges of said floor with the walls supporting said permanent roof;
    (b) an adjustable roof hingedly connected to the front edge of said permanent roof and comprising a top and side panels depending from said top wall and overlapping said side walls;
    (c) a sealing strip carried by each of said panels at the lower edges thereof and engaging said walls; and
    (d) means for holding said adjustable roof in an elevated position relative to such fixed body,
    (e) a rear seat comprising a seat panel, a pad on said panel, a back panel pivotably connected to said seat panel and presenting top and side edges, and a pad on said back panel; and in which the means for securing the rear seat in the vertical position comprises complemental elements on the top and side edges of the seat panel and on the side walls and roof.

2. The body of claim 1 in which the adjustable roof is hingedly mounted on the permanent roof by a central hinge adjacent to the front edges of the roofs and two pairs of pivotably connected arms located adjacent to side edges of the permanent roof and rearwardly of the front edge thereof, together with a pleated piece of waterproof flexible material secured to corresponding edges of the roofs enclosing said hinge and arms, thus providing an air tight seal between the roofs.

3. The body of claim 1 together with a rear seat behind said front seat and foldable into a vertical position behind said front seat and in which position it extends to the permanent roof, together with means for securing said rear seat in said vertical position.

4. The body of claim 1 in which said complemental elements comprise strips of molding on the inner surfaces of said roof and walls with each strip presenting a groove and having an abutment flange adjacent to the groove; a rubber boot secured to each of said edges of the back panel and an inflatable tube in each of said boots.

5. The body of claim 1 in which said power means takes the form of a pair of fluid cylinders secured to said fixed body part adjacent to the side walls, and a pair of pistons reciprocal in said cylinders and having ends connected to the adjustable roof.

6. An automobile body composed of a lower body assembly and a upper body assembly, the upper body assembly pivotally mounted to a member of the lower body assembly to pivot near the top of the windshield frame, the lower body assembly comprising:
    a. the lower parts of a vehicle including the front, windshield and frame;
    b. the forward doors of the vehicle at each side;
    c. an open rear end;
    d. members enclosing the sides and rear of said rear end; and comprising in the upper body assembly:
    e. an elongated roof with depending side and rear panels dimensioned to fit over the sides and rear of said lower body assembly and provided with sealing means;

f. mechanism for elevating or lowering the adjustable upper body assembly means for securing the said upper assembly in relation to the lower body assembly, and whereby the upper body assembly pivoting as one unit can be raised, adjusted and secured to provide easier and greater access, and expandable cargo space, and remain securely fastened in any desired position for travel.

7. The body of claim 6, wherein the front passenger space can be segregated tightly from the rear of the vehicle by means of a foldable partition composed of adjoining panels and capable to fold for seating purposes into an "L" type shape when not serving as partition, together with means to secure the panels in a desired position and sealing strips along the edges of the partition and complementary strips serving as counter parts fixed to the interior of the vehicle.

8. The body of claim 7, wherein an interior roof is provided over the front part of the passenger compartment and said interior roof is connected by means of flexible and expandable material to the pivoting upper roof of the upper body assembly serving to enclose the opening space between said interior roof and the pivoting upper roof, and whereby the front passenger space can be tightly enclosed, and penetration of wind, rain and snow to the passenger and rear space be prevented.

9. The body of claim 6 in which said side members define an open rear end, together with a rear door normally closing said open rear end and swingable on horizontal and vertical axes into open position.

10. The body of claim 6 in which the top and rear panels of the upper body assembly includes a hatch back pivotably mounted thereon and having a rear wall which overlaps said rear door when the door and hatch back are in closed position.

11. The body of claim 6 tobether with a sealing strip in the form of an inflatable tube secured to the lower edge of said rear wall and engaging said rear edge of said floor.

12. The body of claim 6 together with power means for adjusting the position of the hatch back relative to the adjustable roof.

13. The body of claim 6 in which the pad on the back panel of the rear seat is spaced from the upper edge of said panel with the pack panel being formed with the window opening adjacent its upper edge.

14. The body of claim 1 together with a means for securing the said upper assembly in relation to the lower body assembly, and whereby the upper body pivoting as one unit can be raised, adjusted, and secured to provide greater and easier access and expandable cargo space, and remain securely fastened in any desired position for travel.

* * * * *